June 8, 1937.   J. H. NELSON   2,083,157
CUTTING DIE
Filed March 26, 1936
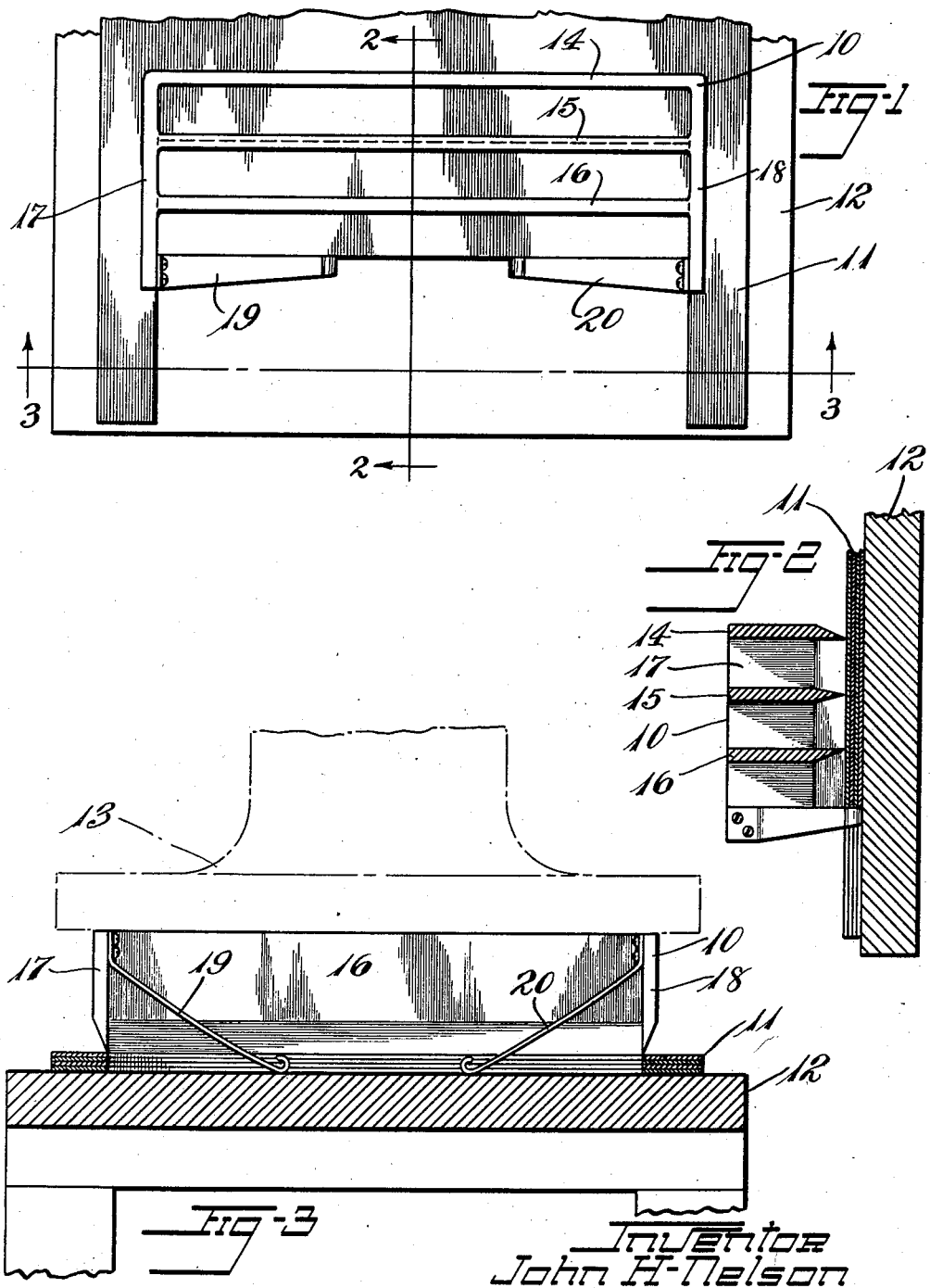
Inventor
John H. Nelson
By Eskin & Avery
Attys.

Patented June 8, 1937

2,083,157

UNITED STATES PATENT OFFICE 2,083,157

CUTTING DIE

John H. Nelson, Belmont, Mass., assignor to Hood Rubber Company, Inc., Watertown, Mass., a corporation of Delaware Application March 26, 1936, Serial No. 70,984

3 Claims. (Cl. 164—29)

This invention relates to cutting dies such as are used for cutting blanks from slabs of leather, laminated fabric, rubber, or similar sheet materials.

Such dies ordinarily consist of an assembly of cutting blades sharpened at one edge and arranged in the form of the desired blanks. The dies are placed on the sheet material and are forced therethrough either by pressure of a press or by blows of a mallet and are moved, usually by hand, from one position on the sheet to another.

The principal objects of the present invention are to avoid waste and to promote efficiency of operation.

Other objects will appear from the following description and the accompanying drawing.

Of the drawing:

Fig. 1 is a plan view of a cutting die embodying the invention in its preferred form, the die being shown as resting upon a sheet of material which in turn rests upon a cutting block.

Fig. 2 is a sectional view taken on line 2—2 of Fig. 1.

Fig. 3 is a sectional elevation taken on line 3—3 of Fig. 1, the pressing head of the press being shown in dot and dash lines.

Referring to the drawing, the numeral 10 designates the die, 11 the sheet of material to be cut, 12 the supporting cutting block, and 13 the pressure head. The die, in the form shown, comprises a series of parallel cutting bars 14, 15, 16 integrally associated with cutting bars 17, 18, and adapted to sever two rectangular strips simultaneously from the sheet.

In order to adapt the die to the cutting of an additional similar strip at each blow and to avoid waste of material between successive cuts of the die, a pair of leaf-spring stops 19, 20 are fixed to cutting bars 17, 18 at a distance from the cutting bar 16 equal to the distance between cutting bars 15 and 16. These springs normally project below the cutting edges and contact with the cutting block 12 but yield freely when the die is forced through the sheet material. After one cut has been made, the die is moved laterally of the sheet in a direction away from the observer of Fig. 3 until the spring stops 19, 20 abut against the margin of the sheet resulting from the last cut, whereupon the die is in position to accomplish the next cut without waste.

While the cutting bars 14, 15, 16 have been shown as straight bars, they may be of any desired contour.

The spring stops assist in raising the cutting die above the sheet after the cut is accomplished.

I claim:

1. A die for cutting blanks from sheet material, said die comprising a cutting blade arranged simultaneously to sever at least two adjacent blanks from the sheet adjacent a margin thereof, and a spring stop device laterally spaced from the cutting blade and normally projecting below the cutting face thereof, said stop device being adapted so to space the cutting blade from the margin of the sheet as to define by said margin a side of one of the blanks.

2. A die for cutting blanks from sheet material, said die comprising a cutting blade arranged simultaneously to sever a series of similar blanks from the sheet adjacent the margin thereof, and a spring stop device laterally spaced from the cutting blade and normally projecting below the cutting face thereof, said stop device being adapted so to space the cutting blade from the margin of the sheet as to define by said margin a side of one of the blanks.

3. A die for cutting blanks from sheet material, said die comprising a cutting blade having an edge adapted to intersect the same margin of the sheet in two places and to define with said margin a blank of the desired shape and size, and spring stop means mounted directly upon said die and normally projecting below the cutting edge thereof in a position adapted to contact with the margin of the sheet and properly to space a portion of the cutting edge therefrom, said portion of the cutting edge being parallel to said margin so that successive blanks may be cut from said sheet without waste by progressive movement of said die away from said margin between cuts.

JOHN H. NELSON.